US 007318330B2

(12) United States Patent
Uhlik

(10) Patent No.: US 7,318,330 B2
(45) Date of Patent: Jan. 15, 2008

(54) MOBILE DEVICE AND A PROCESS FOR THE PRODUCTION OF GLASS

(75) Inventor: James M Uhlik, Clarks Summit, PA (US)

(73) Assignee: Schott Corporation, Yonkers, NY (US)

( * ) Notice: Subject to any disclaimer, the term of this patent is extended or adjusted under 35 U.S.C. 154(b) by 537 days.

(21) Appl. No.: 10/607,527

(22) Filed: Jun. 27, 2003

(65) Prior Publication Data

US 2004/0261458 A1 Dec. 30, 2004

(51) Int. Cl.
*C03B 18/16* (2006.01)
(52) U.S. Cl. .................. 65/182.1; 65/29.1; 65/145; 65/167; 65/333
(58) Field of Classification Search ............. 65/90–98, 65/99.1–99.6, 182.1–182.5, 243, 245, 258, 65/260, 100, 101, 29.1, 66, 145, 167, 227, 65/171–173, 324, 333, 335, 347, 375
See application file for complete search history.

(56) References Cited

U.S. PATENT DOCUMENTS

| | | | |
|---|---|---|---|
| 1,553,773 A | 9/1925 | Heal | |
| 1,564,230 A * | 12/1925 | Gelstharp | 65/254 |
| 1,564,240 A * | 12/1925 | Hitchcock | 65/101 |
| 1,603,946 A * | 10/1926 | Gelstharp | 65/186 |
| 1,771,213 A * | 7/1930 | Gelstharp | 65/198 |
| 3,083,551 A | 4/1963 | Pilkington | |
| 3,220,816 A | 11/1965 | Pilkington | |
| 3,305,339 A * | 2/1967 | Plumat | 65/99.2 |
| 3,480,423 A * | 11/1969 | Itakura | 65/182.1 |
| 3,512,950 A * | 5/1970 | Long | 65/182.1 |
| 3,582,306 A * | 6/1971 | Giffin | 65/121 |
| 3,622,294 A | 11/1971 | Loukes et al. | |
| 3,843,345 A | 10/1974 | Harrell et al. | |
| 3,930,829 A | 1/1976 | Sensi | |
| 3,934,994 A | 1/1976 | Muhlstadt et al. | |
| 3,951,633 A | 4/1976 | Danihel | |
| 3,958,969 A | 5/1976 | Loukes et al. | |
| 3,961,930 A | 6/1976 | Robinson et al. | |
| 3,970,442 A | 7/1976 | Gulotta | |
| 3,980,170 A | 9/1976 | Jakes et al. | |
| 3,996,034 A | 12/1976 | Taylor et al. | |
| 4,001,476 A | 1/1977 | Maltman et al. | |
| 4,013,438 A | 3/1977 | Gladieux et al. | |
| 4,046,549 A | 9/1977 | Miller et al. | |
| RE29,464 E | 11/1977 | Loukes et al. | |
| 4,074,994 A | 2/1978 | Glikman et al. | |
| 4,081,260 A | 3/1978 | Glikman et al. | |
| 4,091,156 A | 5/1978 | Edge et al. | |
| 4,093,493 A | 6/1978 | Welch et al. | |
| 4,115,091 A | 9/1978 | Bourggraff et al. | |
| 4,116,660 A | 9/1978 | Zortea | |

(Continued)

OTHER PUBLICATIONS

Kanthal Silicon Carbide Electric Heating Elements, pp. 1-16 (Mar. 1999).

(Continued)

*Primary Examiner*—Eric Hug
(74) *Attorney, Agent, or Firm*—Millen, White, Zelano, Branigan, P.C.

(57) ABSTRACT

The present invention relates to a float bath comprising a transport assembly and/or an adaptor for producing glass by a float-forming process.

38 Claims, 10 Drawing Sheets

U.S. PATENT DOCUMENTS

| | | | |
|---|---|---|---|
| 4,131,446 A | 12/1978 | Dickinson | |
| 4,133,666 A * | 1/1979 | Rhodes et al. | 65/101 |
| 4,141,713 A * | 2/1979 | Ammannati et al. | 65/182.1 |
| 4,148,622 A | 4/1979 | Heitzer et al. | |
| 4,157,908 A | 6/1979 | Gagne | |
| 4,162,907 A * | 7/1979 | Anderson | 65/29.17 |
| 4,171,966 A * | 10/1979 | Baron et al. | 65/99.1 |
| 4,188,200 A | 2/1980 | Horn | |
| 4,197,107 A | 4/1980 | Kunkle | |
| 4,203,750 A | 5/1980 | Shay | |
| 4,217,125 A | 8/1980 | Dickinson | |
| 4,233,047 A | 11/1980 | Stultz et al. | |
| 4,279,634 A | 7/1981 | Sisoler et al. | |
| 4,303,437 A | 12/1981 | Garcelon | |
| 4,306,898 A | 12/1981 | Masuda et al. | |
| 4,311,508 A | 1/1982 | Schwenninger | |
| 4,312,656 A | 1/1982 | Masuda et al. | |
| 4,319,908 A | 3/1982 | Sensi | |
| 4,322,235 A | 3/1982 | Schwenninger | |
| 4,322,236 A | 3/1982 | Sensi | |
| 4,340,410 A | 7/1982 | May | |
| 4,340,411 A | 7/1982 | May | |
| 4,340,412 A | 7/1982 | May | |
| 4,345,929 A | 8/1982 | Kapura | |
| 4,361,431 A | 11/1982 | Kandachi et al. | |
| 4,395,272 A | 7/1983 | Kunkle et al. | |
| RE31,466 E | 12/1983 | Garcelon | |
| 4,421,541 A | 12/1983 | Eischen et al. | |
| 4,439,222 A | 3/1984 | Kandachi et al. | |
| 4,548,636 A | 10/1985 | Nomaki et al. | |
| 4,741,749 A | 5/1988 | Sensi et al. | |
| 4,749,400 A | 6/1988 | Mouly et al. | |
| 4,769,059 A | 9/1988 | Hidai et al. | |
| 4,784,680 A | 11/1988 | Sato et al. | |
| 4,828,900 A | 5/1989 | Mouly | |
| 4,940,479 A | 7/1990 | Sato et al. | |
| 4,995,893 A | 2/1991 | Jenkins et al. | |
| 5,055,122 A | 10/1991 | Okumura et al. | |
| 5,156,664 A | 10/1992 | Maltby, Jr. et al. | |
| 5,278,108 A | 1/1994 | Cheng et al. | |
| 5,364,435 A | 11/1994 | Nelson | |
| 5,747,398 A | 5/1998 | Higby et al. | |
| 5,939,016 A | 8/1999 | Mathiesen et al. | |
| 6,065,309 A | 5/2000 | Cooper et al. | |
| 6,087,284 A | 7/2000 | Brix et al. | |
| 6,089,043 A | 7/2000 | Courtemanche et al. | |
| 6,094,942 A | 8/2000 | Falleroni et al. | |

OTHER PUBLICATIONS

L.A. B. Pilkington, "The float glass process", Proc. Roy. Soc. Lond. #A314 1-25, Feb. 13, 1969.

* cited by examiner

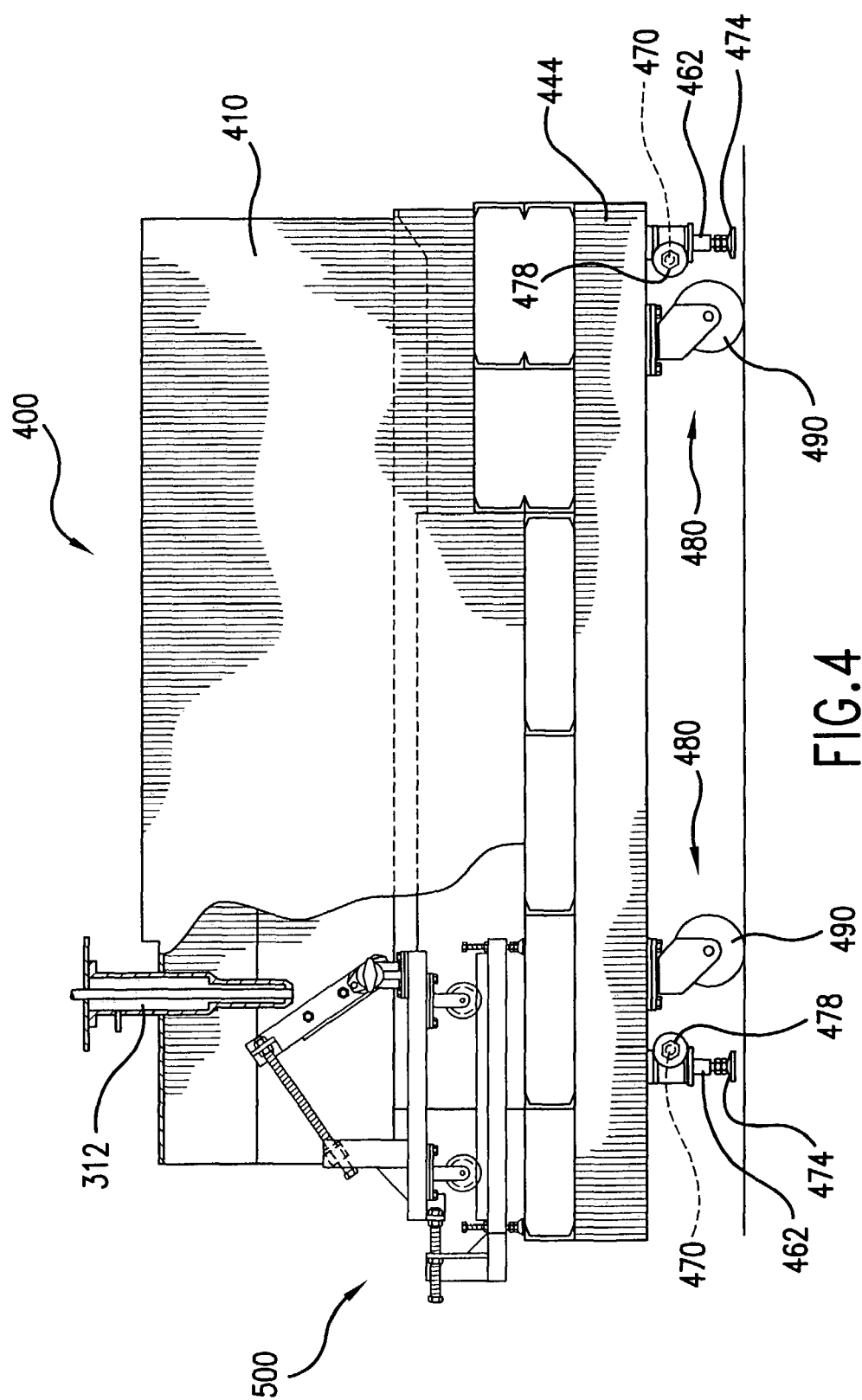

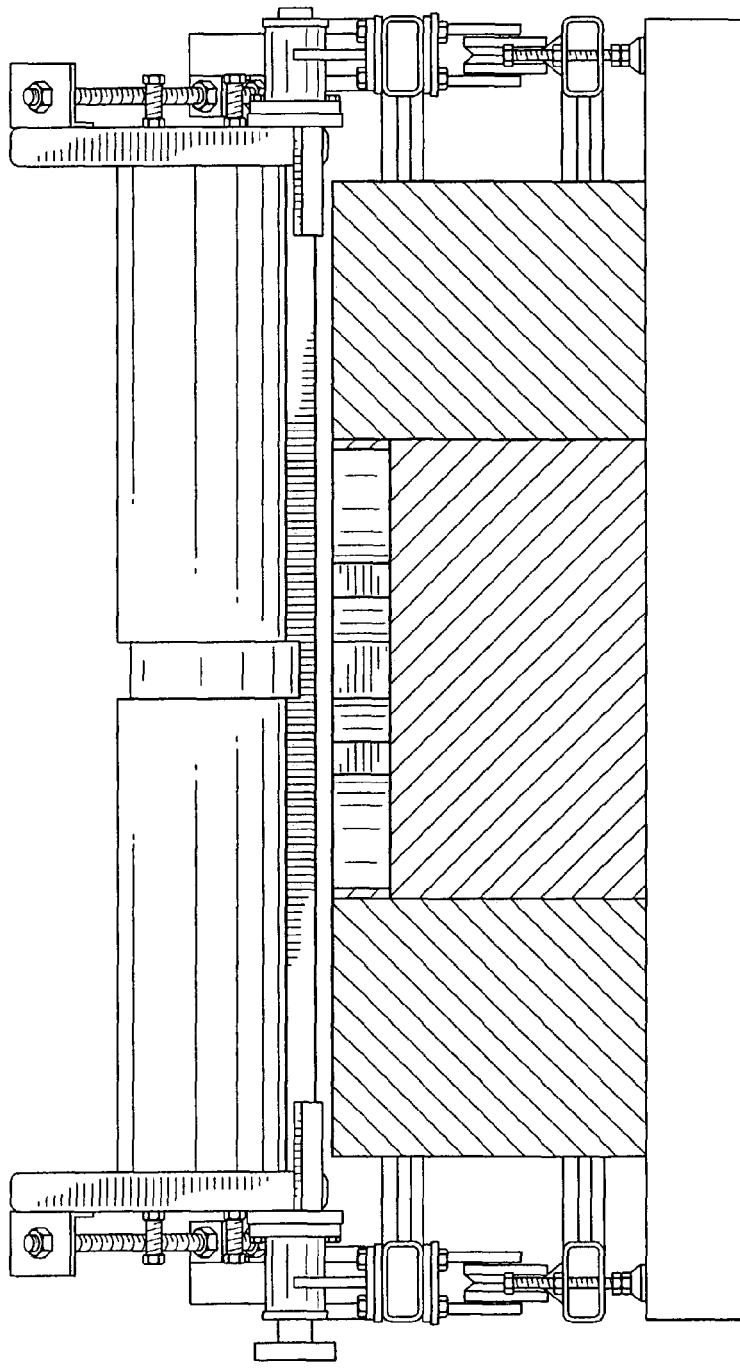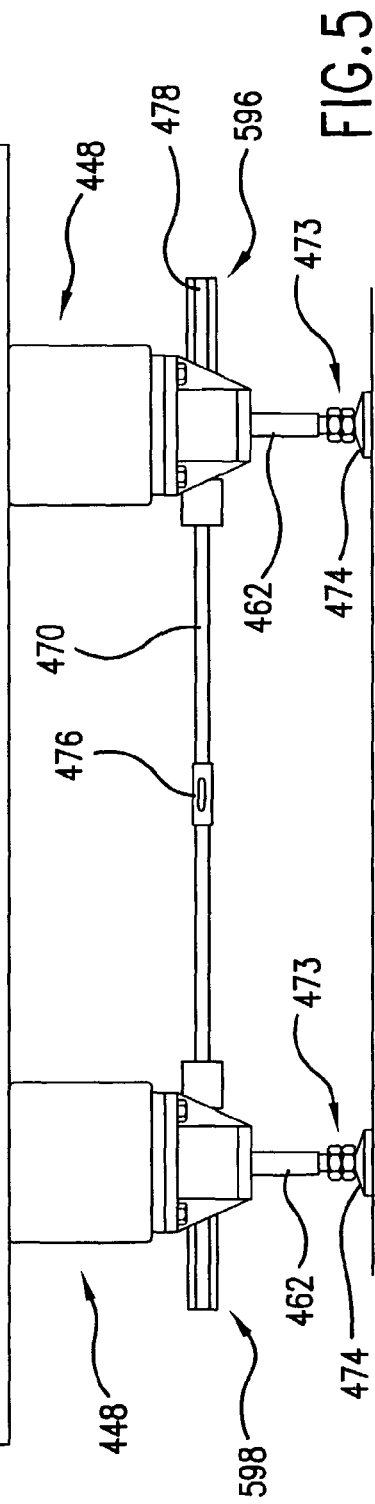
FIG.5

MOBILE DEVICE AND A PROCESS FOR THE PRODUCTION OF GLASS

The present invention generally relates to at least one process or apparatus for making glass, preferably a float glass.

For some applications, there is a desire to make relatively small amounts of glass, which can be used for a particular application. Drawing, pressing, blowing or casting can produce these amounts of glass. After formation of the glass, the glass can be ground or otherwise processed to the size and shape to suit a particular purpose. However, these processes suffer from a common disadvantage, namely, having to perform subsequent steps, such as rigorous grinding, to finalize the glass shape and quality level.

For producing large amounts of glass, typically float glass lines are utilized. FIG. 1 depicts a typical float glass line including a furnace 10, a float bath 40, and a lehr 70. The float glass line includes a float bath containing molten tin. The glass is poured from the furnace 10 onto molten tin in the float bath 40, and withdrawn in a continuous ribbon by the lehr 70. The final glass product generally can be cut into sheets for use in a particular application. Generally, these float glass lines have throughputs of 100-800 tons per day.

Although the float glass lines reduce the necessity of polishing and grinding glass, there are still disadvantages of using these large lines. Particularly, if small batches are required, the turnaround time between batches results in a great deal of waste due to start-up and shutdown. Generally during start-up and shutdown, a great deal of unacceptable product is produced because the float bath 40 is not yet at steady-state. Moreover, not only must the float bath 40 be purged to receive a new batch of glass, but also the furnace 10 must be shutdown and purged to receive a new batch of raw materials, or diluted at high losses. Because of the large amounts of these materials (generally tons) involved, there is much raw material and off-test glass and that must be recycled. This recycling results in a large expenditure of energy, particularly due to the high process temperatures (generally exceeding 1000° C.) required. Consequently, there is a desire to produce small batches of glass by a float glass line process, which minimizes the start-up and turn-around times for switching between various batches of glass.

SUMMARY OF THE INVENTION

The present invention overcomes the above deficiencies. Particularly, the present invention provides a float glass line, preferably, for producing small batches of glass by providing a float bath adapted to be positioned at a plurality of glass melting furnaces and/or lehrs where the furnaces and lehrs are at a different location. What is more, the present invention provides an adapter positioned on a float bath. The adapter is adjustable to provide the proper flow of molten glass from a respective furnace to the tin bath below. Particularly, it is generally desirable to have a glass flow of suitable quality to create a glass ribbon for sheet glass production. In this manner, the adapter is easily altered to affect the glass flow from the furnace to provide the desired characteristics of the glass ribbon.

One exemplary embodiment of the present invention is a float bath for producing glass by a float forming process where the float bath can include a transport assembly for, e.g., moving the float bath among and/or between a plurality of units. Another exemplary embodiment of the present invention is a system for making glass. The system includes a float bath, a transfer assembly for moving the float bath from one location to another, and a plurality of glass melting furnaces each at a different location. Still another exemplary embodiment of the present invention is an adapter for a float bath for producing glass by a float forming process and for delivering an amount of molten glass from a first furnace to the float bath. Particularly, the adapter can be adjustable to receive molten glass from plurality of glass melting furnaces each at a different location. Yet another exemplary embodiment of the present invention is a system for making glass. The system can include a float bath, an adapter for the float bath, and a plurality of glass melting furnaces each at a different location where the adapter is adjustable to receive molten glass from each furnace.

BRIEF DESCRIPTION OF THE DRAWINGS

FIG. 4 depicts another elevational, side, and partial cut-away view of an exemplary float bath of the present invention.

FIG. 5 depicts an elevational, back view of an exemplary float bath of the present invention.

DETAILED DESCRIPTION OF THE PREFERRED EMBODIMENTS

As used herein, the term "mechanical fastener" includes a bolt, a nut, a screw, a nail, a rivet, a staple, a clip, a clamp, a snap, or a pin.

Figure 1:
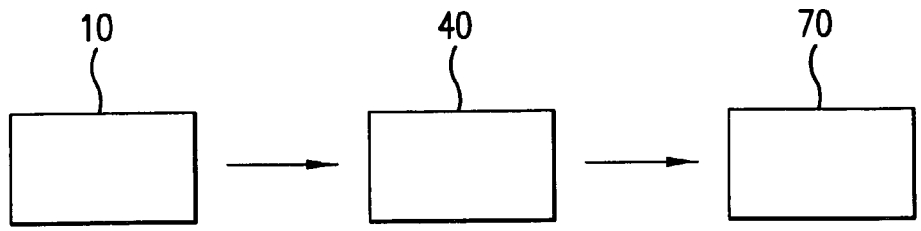
FIG. 1 schematically depicts a glass making process of the prior art.
Figure 2:
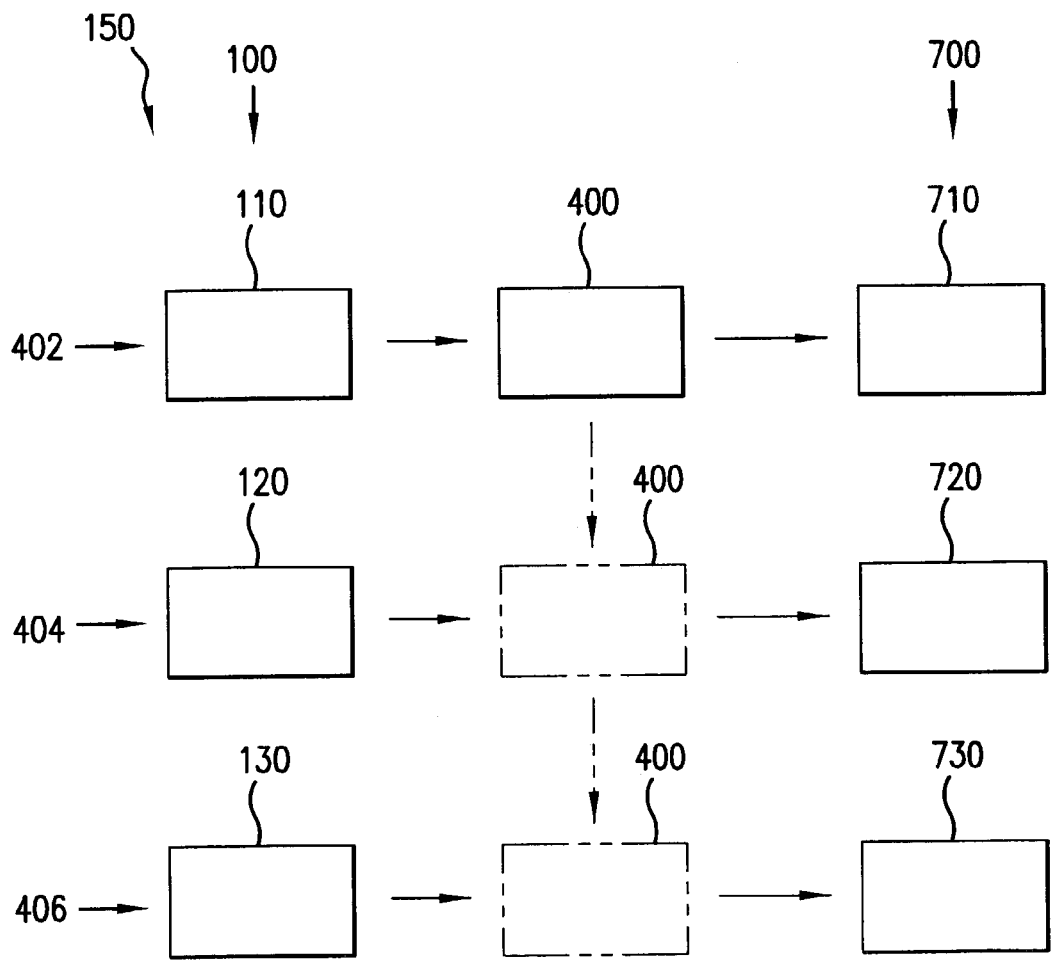
FIG. 2 schematically depicts an exemplary glass making process of the present invention.

An exemplary glass making system 150 of the present invention can include a float bath 400 and a plurality of units, such as a plurality of furnaces 100 and/or a plurality of lehrs 700. As depicted in FIG. 2, the plurality of furnaces 100 can include a first furnace 110, a second furnace 120, and a third furnace 130. The plurality of lehrs 700 can include a first lehr 710, a second lehr 720, and a third lehr 730. Preferably, each furnace 110, 120, and 130 and/or each lehr 710, 720 and 730, are at a different location, such as the first furnace 110 and the first lehr 710 at a first location 402, the second furnace 120 and the second lehr 720 are at a second location 404, and the third furnace 130 and the third lehr 730 are at a third location 406. The float bath 400 can be moved from the first location 402 between the first furnace 110 and the first lehr 710 to the second location 404 between the second furnace 120 and the second lehr 720, or to third location 406 between the third furnace 130 and the third lehr 730.

The furnaces 110, 120 and 130 and the lehrs 710; 720 and 730 may be those known in the art, such as U.S. Pat. Nos. RE 31,466; 4,303,437; and 3,980,170 (relevant to lehrs), and U.S. Pat. No. 4,769,059 (relevant to furnaces), although other lehrs or furnaces can be used. Generally, it may be desirable to scale down the furnaces and/or lehrs to handle throughputs of 1-10 tons per day.

Similarly, the float bath 400, except for the transport assembly 420 and the adapter 500 as described hereinafter, can be a scale-down version of float baths known to those of skill in the art, such as U.S. Pat. Nos. 3,930,829; 3,934,994; 3,951,633; 3,958,969; 3,961,930; 3,996,034; 4,001,476; 4,013,438; 4,046,549; RE 29,464; 4,074,994; 4,081,260; 4,091,156; 4,093,439; 4,115,091; 4,116,660; 4,131,446; 4,141,713; 4,148,622; 4,157,908; 4,162,907; 4,188,200; 4,197,107; 4,203,750; 4,217,125; 4,233,047; 4,279,634; 4,311,508; 4,312,656; 4,319,908; 4,322,235; 4,322,236; 4,340,412; 4,340,411; 4,340,410; 4,361,431; 4,395,272; 4,439,222; 4,548,636; 4,741,749; 4,749,400; 4,784,680; 4,828,900; 4,940,479; 4,995,893; 5,156,664; 5,278,108; 5,364,435; 5,747,398; 5,939,016; 6,065,309, 6,087,284 and 6,089,043, or other float baths.

Typical float baths generally process at least several tons per day of molten glass at high temperature. Consequently, these float baths are generally designed to be fairly sturdy and bulky, to handle the large throughputs and high temperatures. Consequently, such designs make it rather difficult to move them. In addition, when a float bath receives molten glass from a furnace, the angle at which the glass is received in the bath is relevant to properly forming a ribbon. Consequently, once a float bath is positioned near a furnace, moving either the furnace or the float tank requires readjusting one or the other to obtain a proper angle for the molten glass to be received within the float tank. Once the proper angle is obtained, it is generally desired to fix both the furnace and the float tank to maintain this relationship. It is generally not desirable to move either unit as such movement would re-require adjusting either or both of the units.

Figure 3:
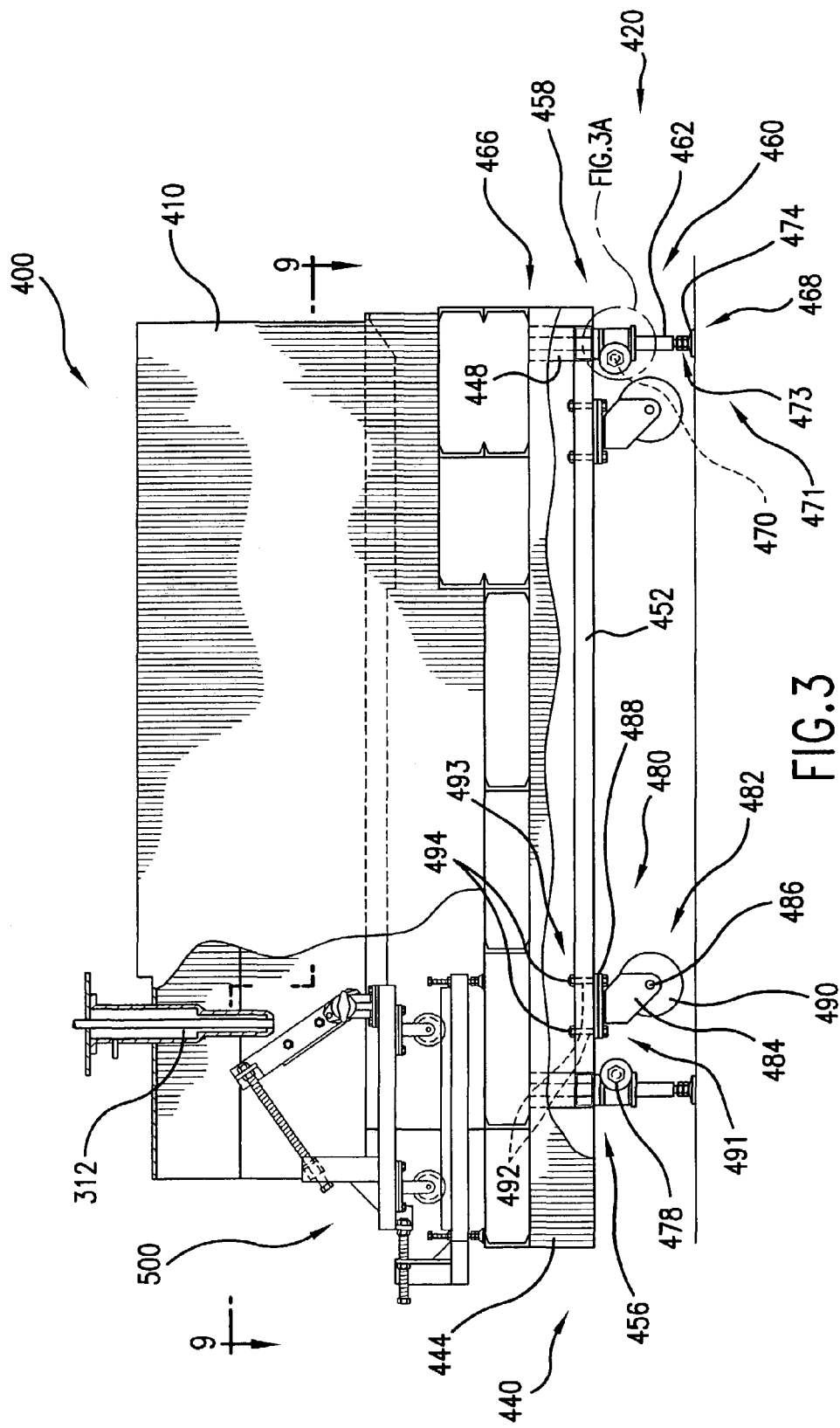
FIG. 3 depicts an elevational, side, and cut-away view of an exemplary float bath of the present invention.

Referring to FIGS. 3-5, a float bath 400 of the present invention can include a transport assembly 420 and an adapter 500. The transport assembly 420 can include an undercarriage 440, a jack assembly 460, and a wheel assembly 480. Generally, the undercarriage 440 includes a skirt 444, a support 448 forming an aperture 454, and a rail 452. The skirt 444 can be formed integrally with and extend below sidewalls 410 of the float bath 400. Generally, the support 448 is formed integrally with the float bath 400 and extends downward. Desirably, the undercarriage 440 includes four supports 448. The rail 452 can be connected at each end 456 and 458 to a respective support 448. Desirably, the undercarriage 440 includes two rails 452 with each rail 452 connected to two supports 448 at each end 456 and 458.

Figure 3A:
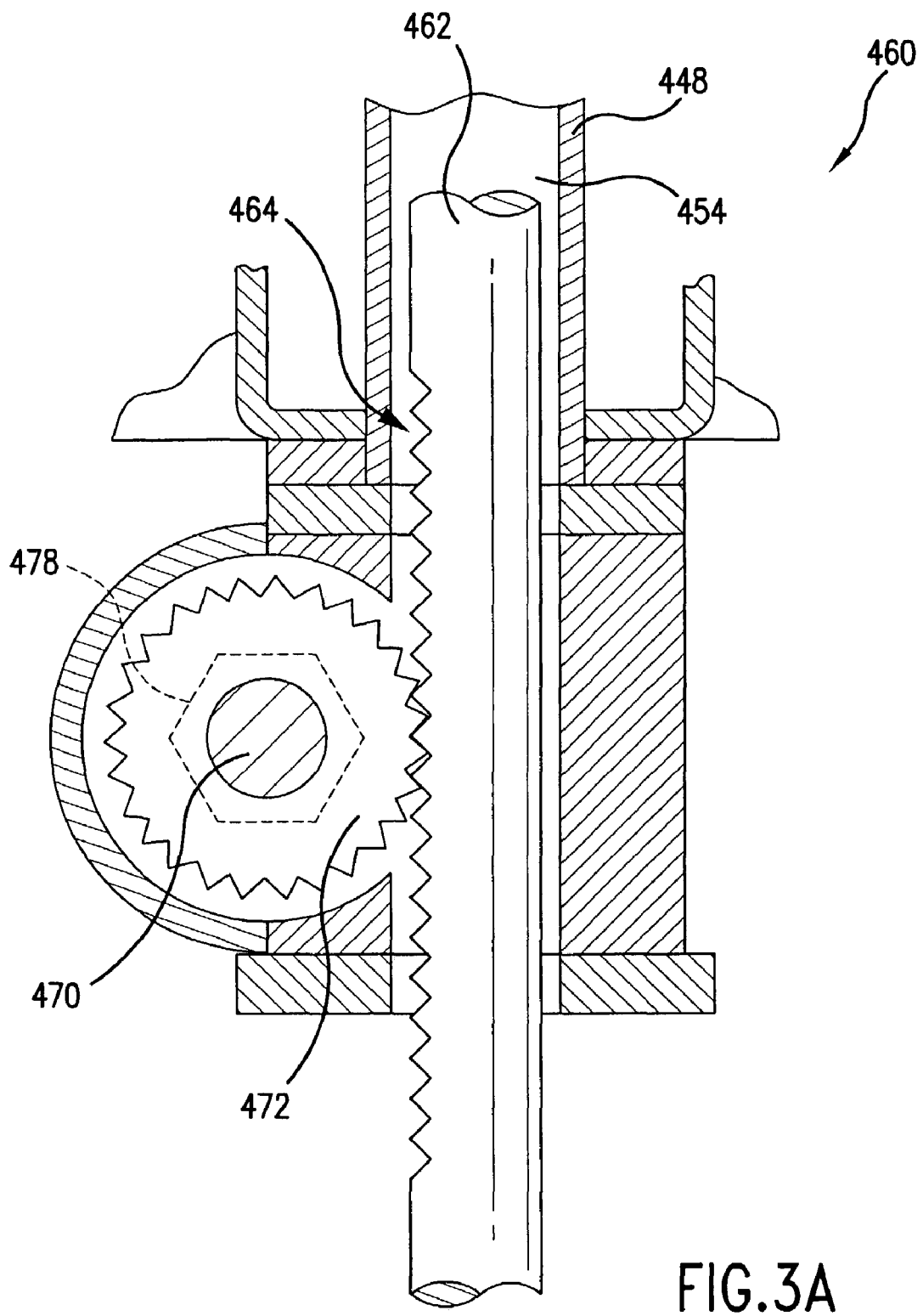
FIG. 3A depicts a cross-sectional, close-up view from FIG. 3 of an exemplary jack assembly of the present invention.

Referring to FIG. 3 and FIG. 3A, the jack assembly 460 can include a leg 462, a foot 474, and a shaft 470. The leg 462 may form a rack 464 on a portion of its circumference and have a first end 466 received within the aperture 454 of the support 448 and an opposing end 468 coupled to the foot 474 by mechanical fasteners such as a pair of nuts 473. The shaft 470 terminating at least at one end, preferably both ends, with a head 478 can be received within an aperture of a gear 472 and pass through two supports 448. Generally, the leg 462 is raised and lowered by engaging the rack 464 and gear 472, although other mechanisms can be utilized such as rack and worm and a rack and wheel. The shaft 470 is generally perpendicular to the rail 452. The shaft 470 may optionally include a clutch 476.

The wheel assembly 480 may include any type of wheel or roller. Desirably, the wheel assembly 480 includes a caster wheel 482 attached to rail 452 by a mechanical fastener 491, such as a bolt 492, passing through apertures in the rail 452 and is secured at an opposing end by mechanical fasteners 493, such as nuts 494. The caster wheel 482 may be rigid or swivel and include a yoke 484 coupled to a plate 488 by any suitable means such as welding. The yoke 484 can secure a wheel 490 about an axle 486. Although a caster wheel 482 is exemplified, other wheel types may be suitable.

In operation, the float bath may initially rest on wheels 490 as depicted in FIG. 4. This permits the movement of the float bath to a desired location. Once the float bath 400 is positioned at the desired location, rotating the hexagonal-shaped head 478 of the shaft 470 can lower the feet 474. Rotating the shaft 470 spins the gear 472, which in turn communicates with the rack 464 of the leg 462. Turning the shaft 470 can lower the foot 474. Lowering all four feet 474 raises the wheel 490 off the ground as depicted in FIG. 3. This permits the start-up of the float bath 400 operation as described hereinafter. To lower the wheels 490, the shaft 470 is rotated in the opposite direction to raise the feet 474. To individually adjust each foot 474, one of the pair of the nuts 473 can be rotated to extend or retract a foot 474. Optionally, a clutch 476 can be included in the shaft 470 to disengage one end 596 of the shaft 470 from the other end 598. This permits independent operation of the feet 474 when rotating the shaft 470. Although the jack assembly 460 has been described, other embodiments can also be used such as those formed integrally with or independent of the float bath 400. Any suitable jack assembly 460 can be used which permits the raising of the wheels 490 to fix the position of the float bath 400. Moreover, different mechanisms can be used to fix and render mobile the float bath 400. As an example, a float bath 400 can rest on posts and a mechanism can be provided to lower wheels 490 to lift the float bath 400 for moving it to a desired location.

Figure 6:
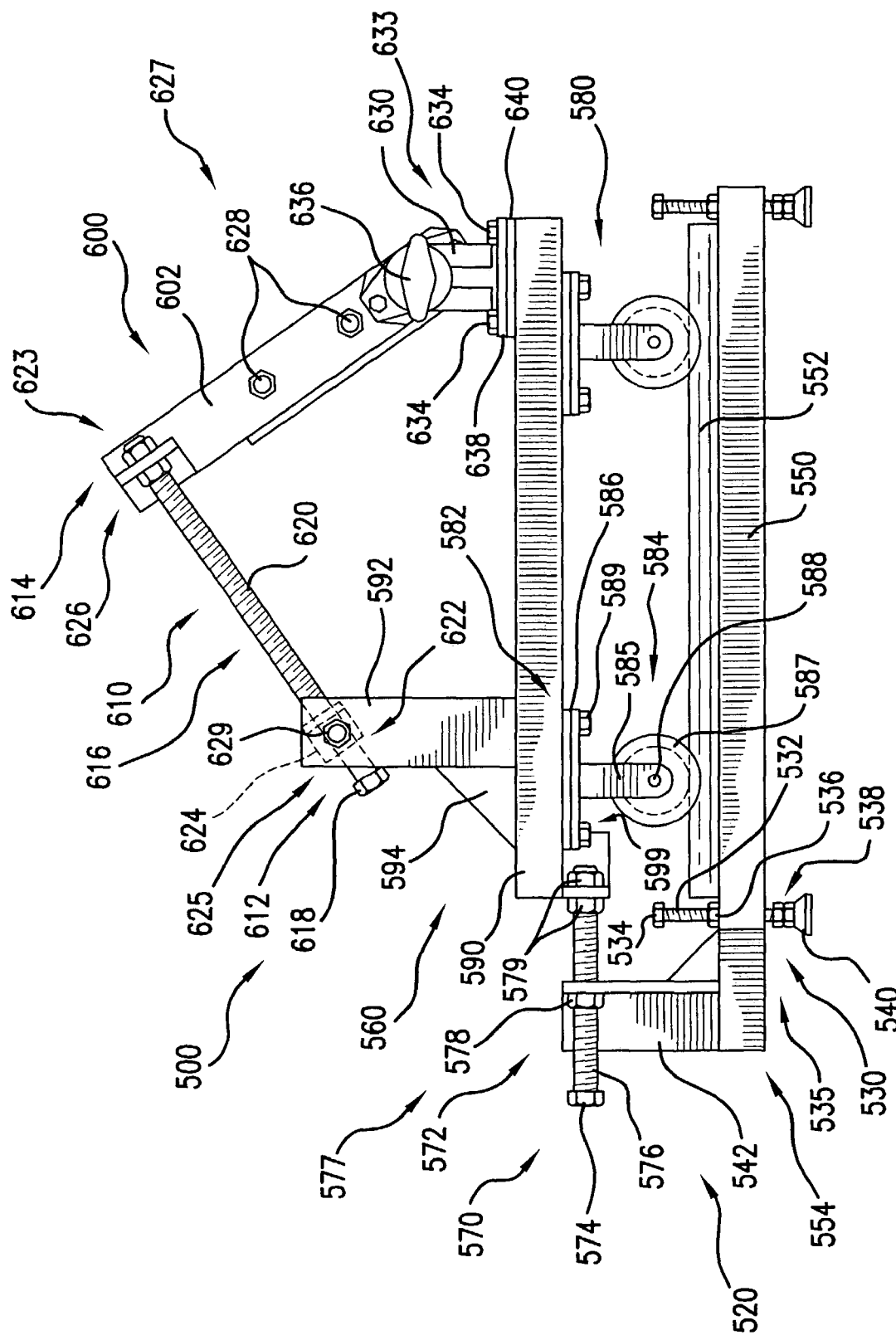
FIG. 6 depicts an elevational, side view of an exemplary adapter of the present invention.
Figure 7:
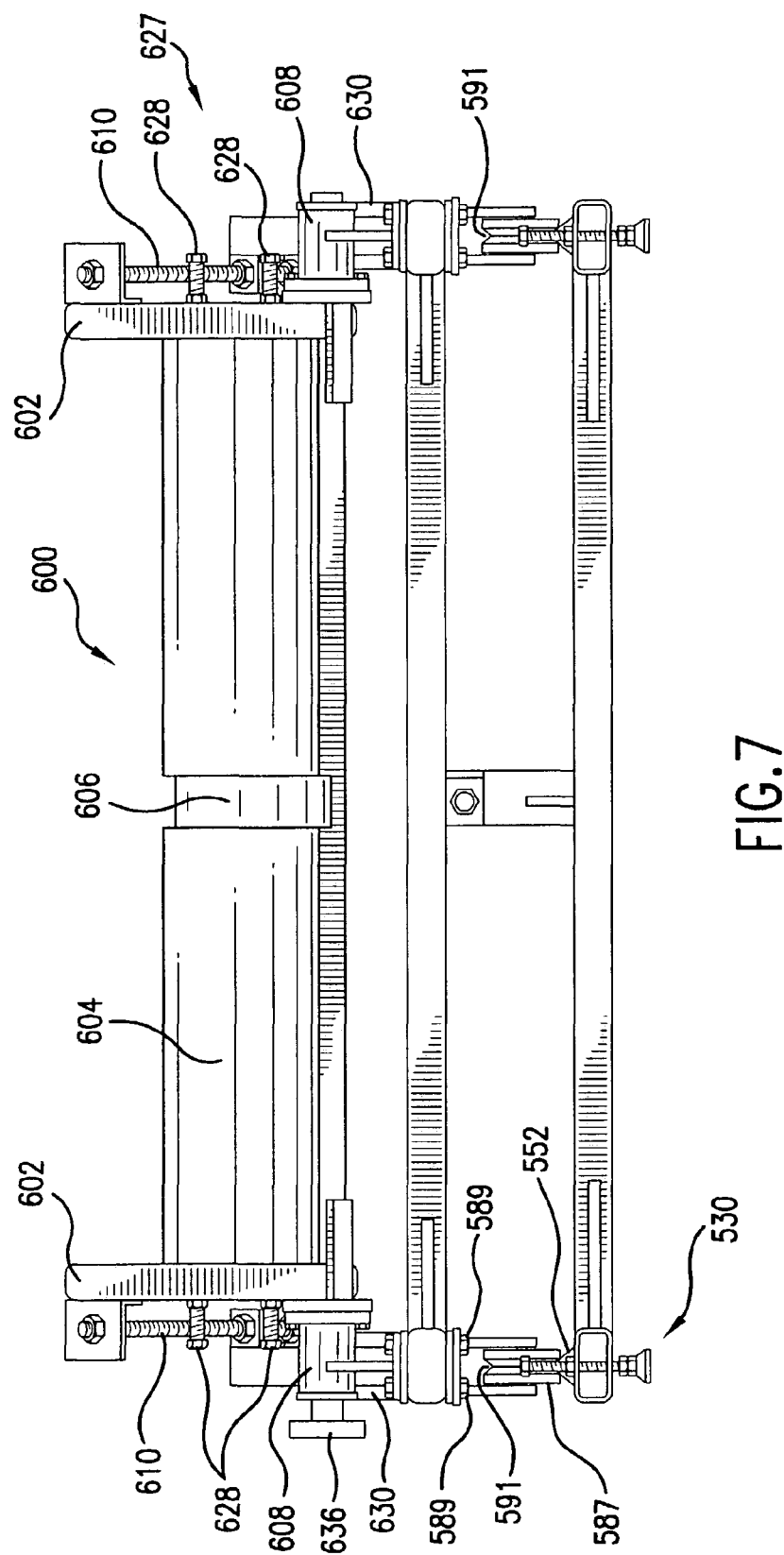
FIG. 7 depicts an elevational, back view of an exemplary adapter of the present invention.

Referring to FIGS. 6-7, an adapter 500 of the present invention can include a base 520, a carriage 560, and a carriage-positioning member 570. The base 520 can include at least one lift 530, a post 542, and a platform 550. Generally, the post 542 is formed integrally with an end 554 of the platform 550. The post 542 is generally perpendicular with respect to the platform 550. The at least one lift 530 may include a screw 532 formed integrally with a head 534, and mechanical fasteners 535 such as a nut 536 and a pair of nuts 538, and a foot 540. The screw 532 passes through the platform 550 and threadably inserts into the foot 540. The pair of nuts 538 may be positioned adjacent to the foot 540 and the nut 536 can be positioned above the foot 540 on an opposing side of the platform 550. Generally, the adaptor 500 includes four lifts 530. The platform 550 can also include a track 552 formed integrally with the platform 550. The carriage-positioning member 570 can include a screw 572 formed integrally with a hexagonal-shaped head 574 at one end, and mechanical fasteners 577 including a first nut 578 and a pair of nuts 579.

The carriage 560 can include at least one transport assembly 580, a body 590, a first post 592, a second post 630, a lip 600, and a lip-positioning member 610. The at least one transport assembly 580 can include at least one, desirably four, wheel assemblies 582. The wheel assembly 582 can include at least one rigid or swivel caster wheel 584. Generally, the caster wheel 584 includes a yoke 585, a plate 586, a wheel 587, an axle 588, and bolts 589. The yoke 585 may secure the wheel 587 about its axle 588. The yoke 585 in turn, can be connected to the plate 586 by any suitable means, such as welding. Generally, the wheel 587 forms a groove 591 about its circumference for receiving the track 552, and the plate 586 is secured to the body 590 by any suitable means such as welds or mechanical fasteners 599, e.g., bolts 589. The first post 592 can include a brace 594 and is attached to the body 590 by any suitable means such as welds or mechanical fasteners. The brace 594 can be attached to the post 592 and the body 590 by using any suitable means such as welds or mechanical fasteners.

The second post 630 can include a clamp 636. The clamp 636 can be inserted through the post 630 to secure the lip 600 as described hereinafter. The adapter 500 can also include mechanical fasteners 633 such as bolts 634 and a first and second plate, respectively, 638 and 640. The post 630 can be secured to the body 590 using any suitable means such as mechanical fasteners, preferably bolts 634. The plate 638 can be attached to the post 630 using any suitable means such as welds or mechanical fasteners. The post 630 and the plates 638 and 640 may be secured to the body 590 by inserting the bolt 634 through the plates 638 and 640, and inserting them into a threaded aperture formed by the body 590.

Desirably, the adapter 500 has two first posts 592, two second posts 630, and two lip positioning members 610.

The lip 600 can include a support 602, a first region 604 forming a flat surface, a second region 606 forming a recess or a spout for molten glass, and rollers 608. The rollers 608 may be connected to the supports 602 using any suitable means such as welds, or mechanical fasteners. Mechanical fasteners 627, such as bolts 628, can secure the first region 604 and the second region 606 to the support 602. Generally, the first region 604 and the second region 606 are made from any suitable material such as platinum or quartz or other refractory material. The first region 604 can be formed integrally with the second region 606, which may be recessed to create a spout for molten glass. The second post 630 may secure respective rollers 608 to permit pivotable movement of the lip 600 with respect to the second post 630.

Optionally, electric heating elements made from material such as silicon carbide can be incorporated into the first region 604 and/or the second region 606 to facilitate heating of these regions during start-up period. Such electric heating elements can be obtained from Kanthol Ltd., Inverolmond, Perth, PH1 3EE, Scotland. Alternatively, the electric heating elements can be positioned overhead with respect to the tin bath, supporting a glass ribbon 300, to provide greater heating capability.

Generally, the lip-positioning member 610 includes a first end 612, a second end 614, a screw 616, and mechanical fasteners 623, such as a pair of nuts 626, and a mechanical fastener 625, such as a bolt 629. The screw 616 can include a head 618 formed integrally with a threaded shaft 620. A portion 622 of the threaded shaft 620 can be received within a threaded sleeve 624 and secured with the bolt 629. At the second end 614, a pair of nuts 626 generally secures the second end 614 of the lip-positioning member 610 to the support 602 of the lip 600.

In operation, the float bath 400 can be moved among the plurality of furnaces 100 and/or the plurality of lehrs 700. Once the float bath 400 is positioned at a particular furnace, it is desirable to have the molten glass flowing into the tin bath at a suitable angle to create the desired glass ribbon, which is subsequently annealed in the lehr to form the desired glass sheet. Consequently, once the float bath 400 is fixed, the adapter 500 can be adjusted to create the desired angle of molten glass entry into the float bath 400. As an example, each head 534 of each screw 532 can be rotated to raise and lower a respective lift 530. This rotation, in turn, raises and lowers the platform 550. In addition, the carriage-adjusting member 570 can be rotated by placing a wrench on the head 574 of a threaded shaft 576 for adjusting the horizontal position of the carriage 560, including the lip 600. Moreover, the lip 600 can be adjusted as well, by e.g., first loosening the clamp 636 to release the lip roller 608 within the post 630 permitting their pivotable movement. After loosening the bolt 629, the threaded shaft 620 can be rotated by placing a wrench on the head 618 to pivot the second end 614 of the lip 600 either toward or away from the first post 592. Once the desired position of the lip 600 is achieved, the bolt 629 can be tightened to secure the threaded shaft 620 and the clamp 636 can be tightened to secure the lip 600.

Figure 8:
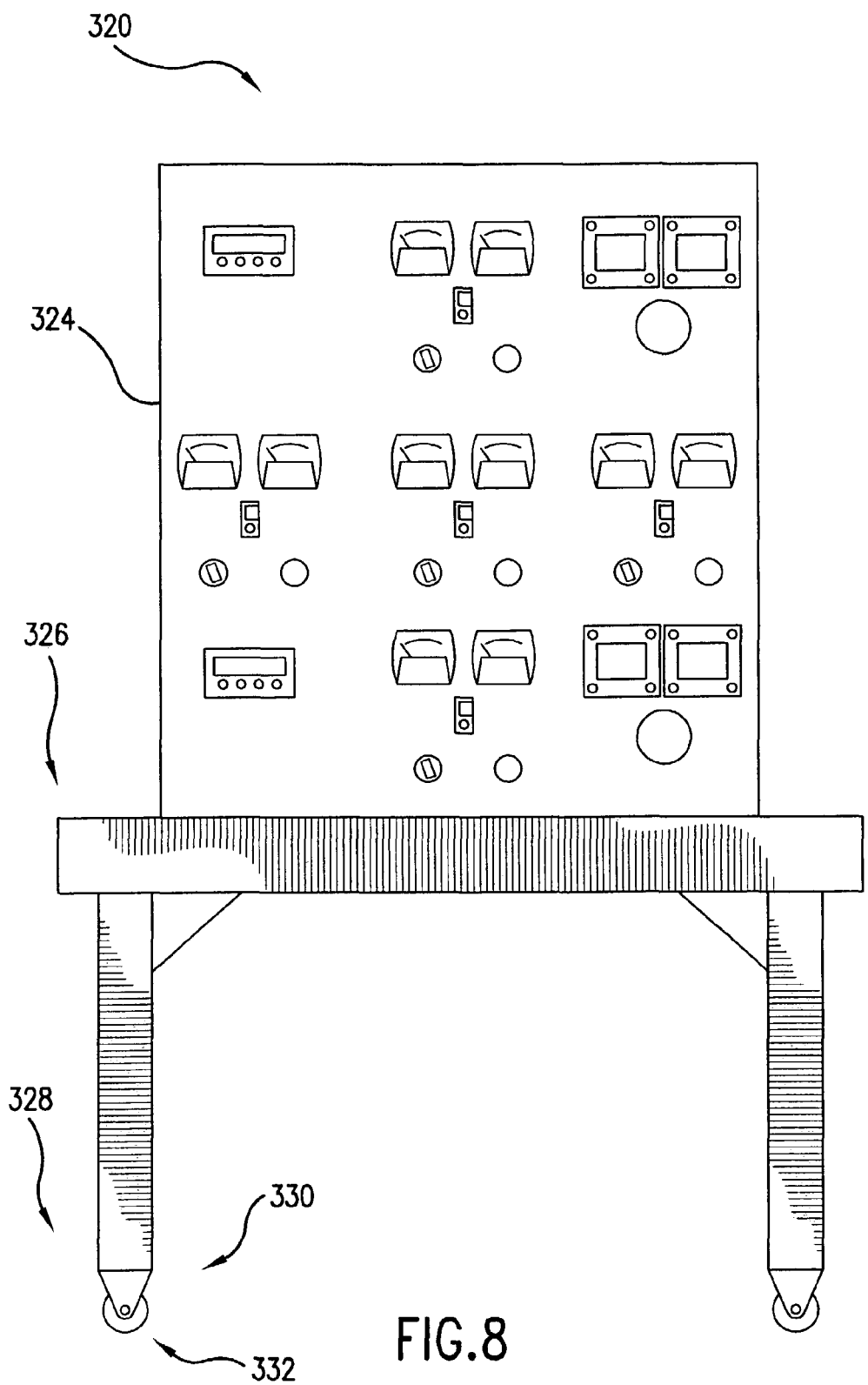
FIG. 8 depicts an elevational, front view of an exemplary portable control system of the present invention.

Referring to FIG. 8, the portable float bath 400 of the present invention can include a portable float bath control system 320. Generally, the control system 320 includes a control box 324 and a cart 326. The cart 326 facilitates the easy movement of the control box 324 with the float bath 400. Preferably, the cart 326 can include a transport assembly 328. In the embodiment depicted by FIG. 8, the transport assembly 328 generally includes at least one, preferably four, wheel assemblies 330. In this preferred embodiment, the wheel assembly 330 is a rigid or swivel caster wheel 332.

In operation, the float bath 400 is fixed between a furnace 110, 120, or 130 and a lehr 710, 720, or 730. Once the lip 600 of the adapter 500 is positioned for receiving molten glass, glass production can begin.

Figure 9:
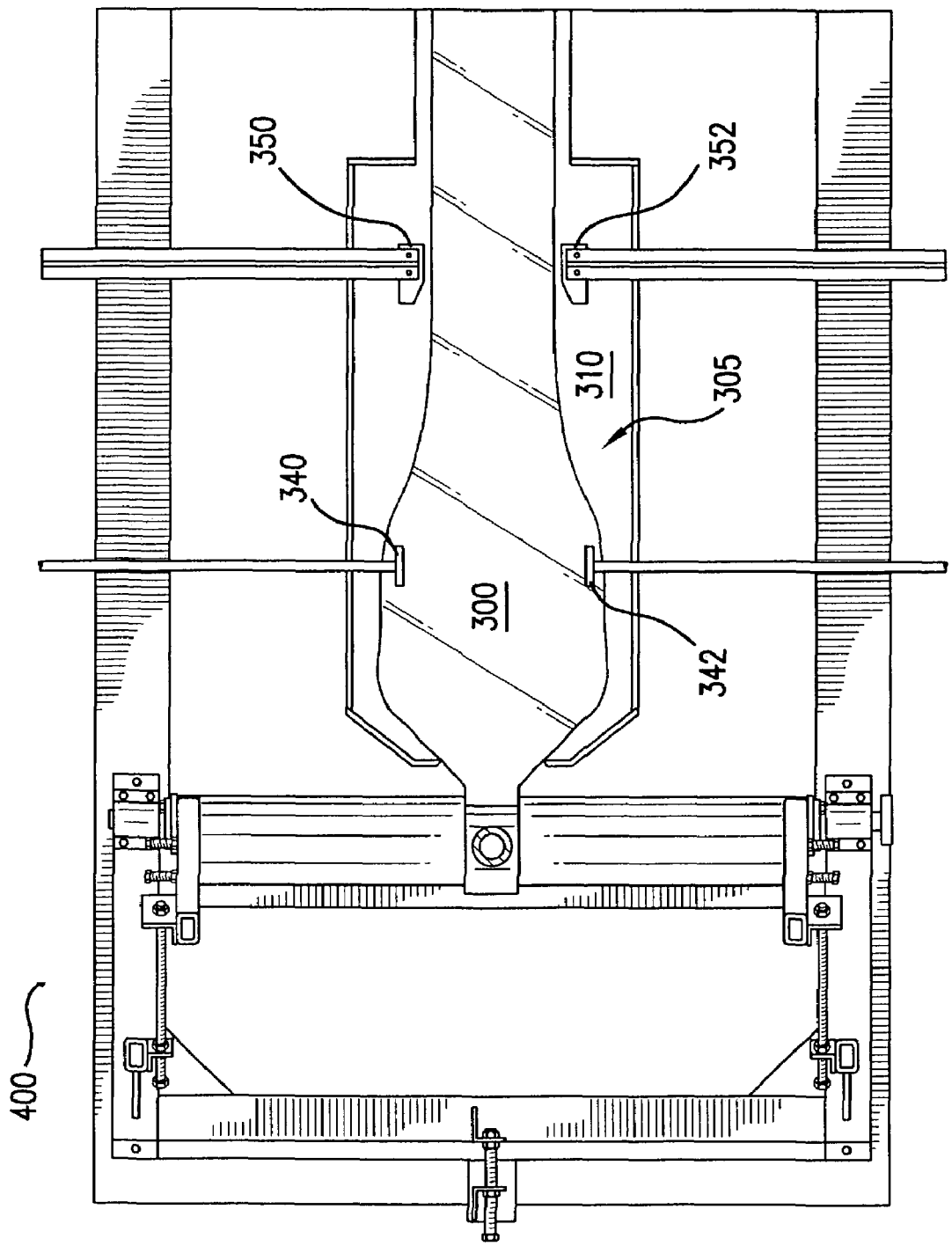
FIG. 9 depicts a plan, top, and cross-sectional view along 9-9 in FIG. 3 of an exemplary float bath of the present invention.

Referring to FIGS. 3 and 9, molten glass flows through a furnace outlet 312 from the furnace 110, 120, or 130 onto the lip 600 of the adapter 500 before entering a bath 305 of molten metal 310, preferably tin. Once the process reaches steady state, the molten glass forms the ribbon 300 on top of the molten metal and is extracted from the float bath with the lehr 710, 720, or 730. Top rolls 340 and 342 can be provided to control the thickness of the ribbon 300, and fences 350 and 352 can be provided to prevent the lateral movement of the ribbon 300 as it is being drawn by the lehr 710, 720, or 730. However, it should be appreciated that additional rolls or fences can be utilized. Also, the bath 400 can be provided with a carbon liner to prevent glass from wetting the interior sides of the bath 400. What is more, carbon dams can be provided to impede the convection currents of the tin. Furthermore, the dimensions of the bath 400 can be altered, such as lengthing the bath or widening the glass exit.

Generally, 1-10 tons, preferably 2-3 tons, per day of glass can be produced. Generally, the glass has a thickness of 1-12 mm, preferably 2-8 mm and optimally 6 mm, although other thicknesses of glass can be made dependent on the desired use. Generally, the glass enters the float bath 400 at a temperature of 1000-1200° C. and exits at a temperature of 500-700° C. The atmosphere above the molten metal is generally a mixture of nitrogen and hydrogen, preferably a mix of 95% nitrogen and 5% hydrogen. The glass ribbon 30 is generally 20-30 cm wide. A process of the present invention can be utilized with all sorts of glasses known to be suitable for float bath processes. Desirably, the glass is a soda lime, borosilicate, optical, or other float glass, including a glass made from and/or including $SiO_2$, $BaNO_3$, $Na_2CO_3$, $K_2CO_3$, $K_2NO_3$, $B_2O_3$, $Al_2O_3$, $Li_2O$, $Na_2O$, $K_2O$, NaCl, $KHF_4$, $NH_4Cl$, CaO, SrO, PbO, $Sb_2O_3$, $Sb_2O_5$, $Fe_2O_3$, $Fe_3O_4$, NiO, $Ni_2O_3$, CoO, $CO_2O_3$, $Co_2O_3$, $Cr_2O_3$, $Mn_2O_3$, $V_2O_5$, $Nd_2O_3$, $CeO_2$, $Pr_2O_3$, $Er_2O_3$, BaO, ZnO, $TiO_2$, $La_2O_3$, $As_2O_3$, CuO, $F_2$, other oxides, or combinations thereof. Preferably the glass is made from or includes $SiO_2$, $B_2O_3$, $Al_2O_3$, $Li_2O$, $Na_2O$, $K_2O$, BaO, ZnO, $TiO_2$, $La_2O_3$, $As_2O_3$, or combinations thereof.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

A pilot test of the glass of the present invention is conducted intermittently over a four-day period. The exemplary glass has the following composition:

TABLE 1

Exemplary Glass

| Oxide | Weight Percent |
| --- | --- |
| $SiO_2$ | 70.20 |
| $B_2O_3$ | 11.50 |
| $BaNO_3$ | 1.60 |
| $Na_2CO_3$ | 8.40 |
| NaCl | 0.40 |
| $K_2CO_3$ | 5.60 |
| $K_2NO_3$ | 1.60 |
| CaO | 0.20 |
| $TiO_2$ | 0.20 |
| $Sb_2O_5$ | 0.30 |

A summary of the glass run is depicted in Table 2:

TABLE 2

| Day | | Flow (tpd) | Flow (gms/min) | Entrance (deg C.) | Exit (deg C.) | Thick (mm) | Thick (in) | Width (mm) | Width (in) | Line Speed (in/min) |
| --- | --- | --- | --- | --- | --- | --- | --- | --- | --- | --- |
| Day 1 | begin | 2.28 | 1442 | 957 | 619 | 9.00 | 0.35 | 188 | 7.40 | 13.4 |
| Day 2 | begin | 2.28 | 1438 | 957 | 613 | 9.10 | 0.36 | 184 | 7.24 | 13.5 |
| | during | 2.32 | 1462 | 974 | 585 | 6.50 | 0.26 | 221 | 8.70 | 16 |
| | end | 2.38 | 1505 | 972 | 734 | 7.04 | 0.28 | 210 | 8.27 | 16.0 |
| Day 3 | begin | 2.31 | 1457 | 974 | 734 | 6.70 | 0.26 | 215 | 8.46 | 15.9 |
| | during | 2.28 | 1436 | 977 | 652 | 10.60 | 0.42 | 134 | 5.28 | 15.9 |
| | end | 2.26 | 1424 | 974 | 722 | 8.00 | 0.31 | 176 | 6.93 | 15.9 |
| Day 4 | begin | 2.25 | 1418 | 971 | 722 | 7.50 | 0.30 | 187 | 7.36 | 15.9 |
| | during | 2.94 | 1854 | 1010 | 711 | 5.50 | 0.22 | 200 | 7.87 | 26.5 |
| | end | 3.39 | 2137 | 1028 | 754 | 4.25 | 0.17 | 216 | 8.50 | 36.6 |

Figure 10:
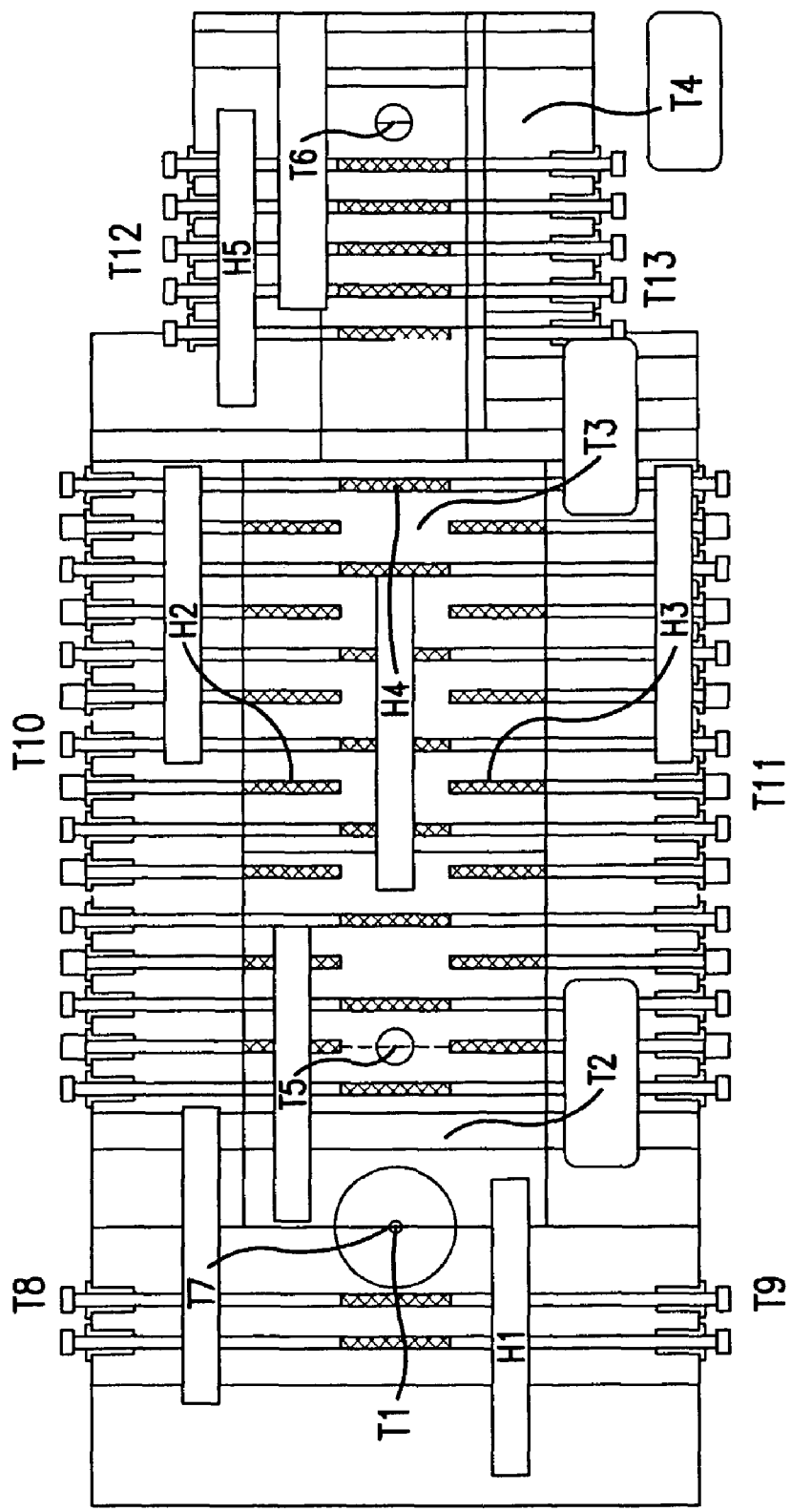
FIG. 10 depicts a plan, cross-sectional, and schematic view of an exemplary float bath of the present invention.

Referring to FIG. 10 and Tables 3-5, various parameters are measured over a 15-hour time period for a pilot test on Day 4. Tables 3-5 are depicted below.

TABLE 3

| | | | Bay 2 | | | | | | Exit | | LIP |
| --- | --- | --- | --- | --- | --- | --- | --- | --- | --- | --- | --- |
| | H1 | | H2 | | H3 | | H4 | | H5 | | T1 |
| Time | Amps | Volts | Amps | Volts | Amps | Volts | Amps | Volts | Amps | Volts | Temp (° C.) |
| 0:00 | 130 | 16.5 | 95 | 62 | 95 | 62 | 360 | 19 | 0 | 0 | 787 |
| 1:00 | 130 | 16.5 | 95 | 62 | 95 | 62 | 360 | 19 | 0 | 0 | 787 |
| 2:00 | 130 | 16.5 | 95 | 62 | 95 | 62 | 360 | 19 | 0 | 0 | 788 |
| 3:00 | 130 | 16.5 | 95 | 62 | 95 | 62 | 360 | 19 | 0 | 0 | 789 |
| 4:00 | 130 | 16.5 | 95 | 62 | 95 | 62 | 360 | 19 | 0 | 0 | 789 |
| 5:00 | 130 | 16.5 | 95 | 62 | 95 | 62 | 360 | 19 | 0 | 0 | 789 |
| 6:00 | 130 | 16.5 | 95 | 62 | 95 | 62 | 360 | 19 | 0 | 0 | 789 |
| 7:00 | 130 | 17 | 95 | 62 | 95 | 62 | 360 | 19 | 0 | 0 | 790 |
| 8:00 | 130 | 17 | 95 | 62 | 95 | 62 | 360 | 19 | 0 | 0 | 790 |
| 9:00 | 130 | 17 | 95 | 62 | 95 | 62 | 360 | 19 | 0 | 0 | 798 |
| 10:00 | 130 | 17 | 95 | 62 | 95 | 62 | 360 | 19 | 0 | 0 | 802 |
| 11:00 | 130 | 17 | 95 | 62 | 95 | 62 | 360 | 19 | 0 | 0 | 805 |
| 12:00 | 130 | 17 | 95 | 62 | 95 | 62 | 360 | 19 | 0 | 0 | 809 |
| 13:00 | 130 | 17 | 95 | 62 | 95 | 62 | 360 | 19 | 0 | 0 | 810 |
| 14:00 | 130 | 17 | 95 | 62 | 95 | 62 | 360 | 19 | 0 | 0 | 818 |
| 15:00 | 130 | 17 | 95 | 62 | 95 | 62 | 360 | 19 | 0 | 0 | 821 |

TABLE 3-continued

| | Tin Temperature (° C.) | | | Glass Temperature (° C.) | | Top Rolls | | | | Dross Box Speed | LEHR Belt Speed | | Glass Dimensions (Cold End) | |
|---|---|---|---|---|---|---|---|---|---|---|---|---|---|---|
| | | | | | | Angle | | Speed (In/min) | | | | | Center Thickness | Width |
| Time | T2 | T3 | T4 | T5 | T6 | Left | Right | Left | Right | (In/min) | (cm/min) | T7 (° C.) | (mm) | (mm) |
| 0:00 | 777 | 764 | 742 | 970 | 721 | | | 15.7 | 16.0 | 15.9 | 40.5 | 1125 | 7.3 | 188.6 |
| 1:00 | 778 | 765 | 743 | 971 | 722 | | | 15.7 | 16.0 | 15.9 | 40.5 | 1125 | 7.0 | 189.8 |
| 2:00 | 778 | 765 | 742 | 971 | 723 | | | 15.7 | 16.0 | 15.9 | 41.0 | 1125 | 7.0 | 189.5 |
| 3:00 | 778 | 766 | 744 | 972 | 724 | | | 15.7 | 16.0 | 15.9 | 40.5 | 1125 | 7.0 | 191.5 |
| 4:00 | 778 | 765 | 743 | 972 | 724 | | | 15.7 | 16.0 | 15.9 | 41 | 1125 | 7.0 | 190.1 |
| 5:00 | 778 | 765 | 743 | 970 | 723 | | | 15.7 | 16.0 | 15.9 | 40.7 | 1125 | 7.2 | 188.3 |
| 6:00 | 777 | 764 | 742 | 971 | 722 | | | 15.7 | 16.0 | 15.9 | 40.5 | 1125 | 7.5 | 188.0 |
| 7:00 | 777 | 765 | 742 | 970 | 722 | | | 15.7 | 15.7 | 15.9 | 40.6 | 1125 | 7.25 | 185.0 |
| 8:00 | 774 | 760 | 732 | 977 | 700 | | | 15.7 | 15.7 | 15.9 | 40.6 | 1125 | 8.0 | 182.0 |
| 9:00 | 798 | 784 | 756 | 1009 | 713 | | | 15.7 | 15.7 | 21.5 | 57.6 | 1157 | 6.6 | 228.0 |
| 10:00 | 801 | 785 | 759 | 1009 | 713 | | | 15.7 | 15.7 | 21.5 | 57.6 | 1157 | 6.0 | 220.0 |
| 11:00 | 802 | 787 | 759 | 1010 | 711 | | | 15.7 | 15.7 | 26.5 | 68.0 | 1158 | 5.5 | 203.0 |
| 12:00 | 804 | 788 | 761 | 1014 | 713 | | | 15.7 | 15.7 | 26.5 | 70.5 | 1158 | 5.4 | 195.0 |
| 13:00 | 801 | 785 | 759 | 1014 | 727 | | | 15.7 | 15.7 | 29.3 | 76.2 | 1158 | 4.9 | 198.0 |
| 14:00 | 824 | 808 | 783 | 1028 | 754 | | | 15.7 | 15.7 | 36.6 | 94.6 | 1158 | 5.59 | 216.4 |
| 15:00 | 827 | 812 | 787 | 1023 | 757 | | | | | 36.6 | 94.6 | 1175 | 4.40 | 220.0 |

TABLE 4

| | N₂ FLOW (Direct Reading from Flow Meters in SCFH) | | | | | | TOTAL FLOW | | FLOW of Mixed N₂—H₂ | | | |
|---|---|---|---|---|---|---|---|---|---|---|---|---|
| | T7 | H1 | | T5 | T6 | T1 | Nitrogen | Hydrogen | H2 | H3 | H5 | |
| Time | (0-20 scfh) | LEFT (0-100 scfh) | RIGHT (0-100 scfh) | (0-20 scfh) | (0-20 scfh) | (0-100 schf) | (in %) | (in %) | (0-65) | (0-65) | (0-65) | T4 (0-65) |
| 0:00 | 10 | 50 | 50 | 20 | 20 | 190 | 85 | 78 | 55 | 55 | 55 | 55 |
| 1:00 | 10 | 50 | 50 | 20 | 20 | 190 | 85 | 78 | 55 | 55 | 55 | 55 |
| 2:00 | 10 | 50 | 50 | 20 | 20 | 190 | 85 | 78 | 55 | 55 | 55 | 55 |
| 3:00 | 10 | 50 | 50 | 20 | 20 | 190 | 85 | 78 | 55 | 55 | 55 | 55 |
| 4:00 | 10 | 50 | 50 | 20 | 20 | 190 | 85 | 78 | 55 | 55 | 55 | 55 |
| 5:00 | 10 | 50 | 50 | 20 | 20 | 190 | 85 | 78 | 55 | 55 | 55 | 55 |
| 6:00 | 10 | 50 | 50 | 20 | 20 | 190 | 85 | 78 | 55 | 55 | 55 | 55 |
| 7:00 | 10 | 50 | 50 | 20 | 20 | 190 | 85 | 78 | 55 | 55 | 55 | 55 |
| 8:00 | 10 | 50 | 50 | 20 | 20 | 190 | 85 | 78 | 55 | 55 | 55 | 55 |
| 9:00 | 10 | 50 | 50 | 20 | 20 | 190 | 85 | 78 | 55 | 55 | 55 | 55 |
| 10:00 | 10 | 50 | 50 | 20 | 20 | 190 | 85 | 78 | 55 | 55 | 55 | 55 |
| 11:00 | 10 | 50 | 50 | 20 | 20 | 190 | 85 | 78 | 55 | 55 | 55 | 55 |
| 12:00 | 10 | 50 | 50 | 20 | 20 | 190 | 85 | 78 | 55 | 55 | 55 | 55 |
| 13:00 | 10 | 50 | 50 | 20 | 20 | 190 | 85 | 78 | 55 | 55 | 55 | 55 |
| 14:00 | 10 | 50 | 50 | 20 | 20 | 190 | 85 | 78 | 55 | 55 | 55 | 55 |
| 15:00 | 9 | 45 | 45 | 20+ | 20+ | 180 | 85 | 78 | 55 | 55 | 55 | 55 |

TABLE 5

| Time | T8 (° C.) | T9 (° C.) | T10 (° C.) | T11 (° C.) | T12 (° C.) | T13 (° C.) |
|---|---|---|---|---|---|---|
| 0:00 | 101 | 105 | 196 | 197 | 108 | 115 |
| 1:00 | 101 | 105 | 196 | 196 | 108 | 116 |
| 2:00 | 101 | 105 | 196 | 197 | 108 | 116 |
| 3:00 | 100 | 105 | 195 | 197 | 108 | 115 |
| 4:00 | 100 | 104 | 196 | 197 | 108 | 115 |
| 5:00 | 100 | 104 | 196 | 196 | 107 | 115 |
| 6:00 | 100 | 104 | 196 | 196 | 107 | 115 |
| 7:00 | 100 | 104 | 196 | 196 | 107 | 114 |
| 8:00 | 100 | 105 | 196 | 196 | 107 | 114 |
| 9:00 | 101 | 104 | 197 | 196 | 107 | 112 |
| 10:00 | 102 | 104 | 197 | 196 | 107 | 111 |
| 11:00 | 103 | 105 | 198 | 197 | 107 | 111 |
| 12:00 | 105 | 106 | 199 | 198 | 107 | 112 |
| 13:00 | 105 | 107 | 198 | 199 | 108 | 113 |
| 14:00 | 105 | 107 | 199 | 200 | 110 | 113 |
| 15:00 | 106 | 108 | 200 | 201 | 112 | 114 |

These tests provide an exemplary sheet of glass having a thickness of about 5-8 mm.

The entire disclosure of all applications, patents and publications, cited herein is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A moveable float bath for producing glass by a float forming process, comprising a float bath and a transport assembly for moving said float bath wherein the transport assembly comprises at least one rail, at least two supports, and at least one wheel or roller assembly, wherein said at least one rail is attached at one end to one of said at least two supports and is attached at the other end to another of said at least two supports, and at least one wheel or roller assembly is attached to said at least one rail.

2. A float bath according to claim 1, wherein the transport assembly further comprises at least one jack assembly.

3. A float bath according to claim 2, wherein the at least one wheel assembly is a caster wheel and the at least one jack assembly comprises a leg forming a rack communicating with a gear formed integrally with a shaft.

4. A float bath according to claim 1, wherein the transport assembly comprises:
an undercarriage comprising said at least two supports wherein said supports are coupled to the float bath; and said at least one rail is orientated substantially perpendicular to two of said supports; and
a jack assembly comprising:
at least one leg having a first end received within an aperture of one of said supports and having an opposing end coupled to a foot wherein the leg forms a rack; and
at least one shaft coupled to said one of said supports and formed integrally with a gear communicating with the rack.

5. A float bath according to claim 4, wherein the wheel assembly comprises a rigid or swivel caster wheel.

6. A float bath according to claim 1, further comprising at least two wheels.

7. A float bath according to claim 1, further comprising at least four wheels.

8. A float bath according to claim 1, further comprising a portable float bath control system, comprising:
a control box positioned on a cart for positioning the control box proximate to the float bath.

9. A float bath according to claim 1, wherein the float bath contains a molten metal supporting a glass ribbon thereon, and the float bath further comprises a first roller, a second roller, a first fence and a second fence, wherein the first and second rollers a are positioned proximate to one edge of the glass ribbon, and the first and second fence are positioned proximate to another edge of the glass ribbon.

10. A float bath according to claim 1, further comprising a carbon liner or carbon dam.

11. A float bath according to claim 1, wherein the transport assembly comprises at least two rails, at least four supports, and at least two wheels or rollers, wherein each of said rails is attached at each end to a support, and at least one wheel or roller is attached to each of said rails.

12. A float bath according to claim 11, wherein at least two wheels or rollers are attached to each of said rails.

13. A float bath according to claim 12, further comprising a jack assembly associated with each of said four supports.

14. A process for producing float glass comprising pouring molten glass into a float bath onto a bed of a molten metal to create a glass ribbon, and drawing the glass ribbon to create a sheet of glass, wherein said float bath is a float bath according to claim 1.

15. A process according to claim 14, wherein the glass is made from $SiO_2$, $B_2O_3$, $Al_2O_3$, $Li_2O$, $Na_2O$, $K_2O$, $BaO$, $ZnO$, $TiO_2$, $La_2O_3$, or $As_2O_3$, or combinations thereof.

16. A process according to claim 14, wherein the molten metal comprises tin.

17. An adapter for a float bath for continuously producing a glass ribbon by a float forming process and for delivering an amount of molten glass from a first furnace to the float bath wherein the adapter is adjustable to receive molten glass from a plurality of glass melting furnaces each at a different location.

18. An adapter according to claim 17, comprising:
a base comprising at least one lift coupled to a platform; and
a carriage comprising at least one transport assembly coupled to a body wherein the carriage is coupled to the base in a manner allowing substantially parallel movement of the body with respect to the platform.

19. An adapter according to claim 18, wherein the at least one transport assembly comprises at least one wheel, at least one rail or runner, or at least one roller.

20. An adapter according to claim 18, wherein the at least one transport assembly comprises at least one wheel assembly.

21. An adapter according to claim 20, wherein the at least one wheel assembly comprises a caster wheel.

22. An adapter according to claim 18, wherein the lift comprises a screw comprising a head; a plurality of mechanical fasteners; and a foot.

23. An adapter according to claim 18, wherein the adapter further comprises a carriage-positioning member comprising a screw, which comprises a head formed integrally with a threaded shaft, and a plurality of mechanical fasteners.

24. An adapter according to claim 18, wherein the transport assembly comprises at least one wheel.

25. An adapter according to claim 18, wherein the carriage further comprises a first post formed integrally with the body, a lip pivotably mounted on the body, and a lip positioning member having a first end coupled to the first post and a second end coupled to the lip.

26. An adapter according to claim 25, wherein the lip positioning member comprises a screw comprising a head formed integrally with a threaded shaft, a threaded sleeve adapted to receive a portion of the threaded shaft, and a plurality of mechanical fasteners.

27. An adapter according to claim 18, wherein the transport assembly comprises two wheels.

28. An adapter according to claim 18, wherein the transport assembly comprises four wheels.

29. An adapter according to claim 25, wherein the carriage further comprises a second post coupled to the body and a clamp adapted to release the lip in a conveniently fashionable manner for pivoting the lip with respect to the body.

30. An adapter according to claim 25, wherein the lip forms a spout.

31. An adapter for a float bath for producing glass by a float forming process and for delivering an amount of molten glass from a first furnace to the float bath wherein the adapter is adjustable to receive molten glass from a plurality of glass melting furnaces each at a different location.

32. A float bath for producing glass by a float forming process, comprising a transport assembly for moving the float bath among a plurality of units, wherein the transport assembly comprises at least one wheel assembly and at least one jack assembly.

33. A float bath for producing glass by a float forming process, comprising a float bath and a transport assembly for moving said float bath, wherein said transport assembly comprises an undercarriage having at least one support coupled to said float bath; at least one rail coupled and orientated substantially perpendicular to said at least one support; a jack assembly comprising at least one leg having a first end received within an aperture of said at least one support and having an opposing end coupled to a foot wherein said at least one leg forms a rack;

at least one shaft coupled to said at least one support and formed integrally with a gear communicating with said rack; and at least one wheel assembly coupled to said at least one rail.

34. A float bath for producing glass by a float forming process, comprising a transport assembly for moving the float bath among a plurality of units and a portable float bath control system, said portable float bath control system comprising a control box positioned on a cart for positioning the control box proximate to the float bath.

35. A system for making glass, comprising a plurality of glass melting furnaces each at a different location; and a float bath according to claim 1 wherein said float bath is moveable among the plurality of glass melting furnaces for receiving a molten glass from a furnace.

36. A float bath system for producing glass by a float forming process, said system comprising:

a plurality of float bath production lines each comprising a furnace for producing molten glass and a lehr for annealing a glass ribbon, and a float bath according to claim 1 wherein said float bath is moveable from a position between a furnace and a lehr of one production line to a position between a furnace and a lehr of another production line.

37. An adjustable adapter for delivering an amount of molten glass from a furnace to a float bath comprising:

a base comprising a platform, a post, a track, at least one lifi positioned beneath said platform, and a carriage-positioning member attached, and a carriage comprising a body, a first post, a second post, a lip attached to said second post, a lip-positioning member attached to said lip and said first post, and a transport assembly having at least two wheel assemblies, wherein said wheel assemblies interact with said track to permit movement of said carriage relative to the platform of said base, and said carriage-positioning member is attached to said post of said base and to said carriage.

38. An adjustable adapter according to claim 37, wherein said adaptor comprises at least four lifts and at least four wheel assemblies.

* * * * *

UNITED STATES PATENT AND TRADEMARK OFFICE
CERTIFICATE OF CORRECTION

| | | |
|---|---|---|
| PATENT NO. | : 7,318,330 B2 | Page 1 of 1 |
| APPLICATION NO. | : 10/607527 | |
| DATED | : January 15, 2008 | |
| INVENTOR(S) | : James M. Uhlik | |

It is certified that error appears in the above-identified patent and that said Letters Patent is hereby corrected as shown below:

Column 11, line 49, reads "second rollers a are" should read -- second rollers are --
Column 14, line 11, reads "lifi positioned" should read -- lift positioned --

Signed and Sealed this

Twenty-ninth Day of July, 2008

JON W. DUDAS
*Director of the United States Patent and Trademark Office*